(12) United States Patent
Nelkenbaum

(10) Patent No.: US 6,751,297 B2
(45) Date of Patent: Jun. 15, 2004

(54) METHOD AND SYSTEM FOR MULTIMEDIA NETWORK BASED DATA ACQUISITION, RECORDING AND DISTRIBUTION

(75) Inventor: Yossi Nelkenbaum, Yavne (IL)

(73) Assignee: Comverse Infosys Inc., Woodbury, NY (US)

(*) Notice: Subject to any disclaimer, the term of this patent is extended or adjusted under 35 U.S.C. 154(b) by 0 days.

(21) Appl. No.: 09/732,720

(22) Filed: Dec. 11, 2000

(65) Prior Publication Data
US 2002/0071529 A1 Jun. 13, 2002

(51) Int. Cl.[7] .............................. H04M 1/64; H04M 3/42
(52) U.S. Cl. ................ 379/88.13; 379/67.1; 379/88.18; 379/88.22; 379/88.25; 379/202.01; 379/265.09
(58) Field of Search ........................... 379/67.1, 69, 74, 379/83, 88.13, 88.14, 88.17, 88.18, 88.22, 88.25, 900, 908, 902, 202.01, 205.01, 265.09

(56) References Cited

U.S. PATENT DOCUMENTS

| | | | | |
|---|---|---|---|---|
| 5,535,256 A | * | 7/1996 | Maloney et al. ............... 379/34 |
| 5,608,786 A | * | 3/1997 | Gordon ....................... 379/100 |
| 5,675,507 A | * | 10/1997 | Bobo, II ................... 364/514 R |
| 5,689,553 A | * | 11/1997 | Ahuja et al. ................. 379/202 |
| 5,790,798 A | * | 8/1998 | Beckett, II et al. ...... 395/200.54 |
| 5,881,132 A | | 3/1999 | O'Brien et al. ............... 379/35 |
| 5,923,744 A | | 7/1999 | Cheng .................... 379/221.09 |
| 6,055,307 A | | 4/2000 | Behnke et al. ......... 379/265.14 |
| 6,078,648 A | | 6/2000 | Albers et al. ................. 379/35 |
| 6,233,318 B1 | * | 5/2001 | Picard et al. ............ 397/88.17 |
| 6,542,736 B1 | * | 4/2003 | Parkvall et al. ............. 455/422 |
| 6,553,219 B1 | * | 4/2003 | Vilander et al. ............ 455/411 |

* cited by examiner

Primary Examiner—Allan Hoosain
(74) Attorney, Agent, or Firm—Sughrue Mion, PLLC

(57) ABSTRACT

An intelligent digital recording system, in conjunction with public centralized network resources, provides wide area multimedia (Fax, Internet, Screens, Video, Voice, etc.) recording SERVICES. The architecture allows parallel recording from a variety of communication sources, i.e., wireline and wireless networks etc. and the stored data can be accessed by the end users via a variety of multimedia mediums or can be distributed to the users on a predetermined schedule using several different storage and/or transmission mediums.

65 Claims, 3 Drawing Sheets

METHOD AND SYSTEM FOR MULTIMEDIA NETWORK BASED DATA ACQUISITION, RECORDING AND DISTRIBUTION

FIELD OF THE INVENTION

The present invention is a new wide area service provided to businesses and private clients. The invention relates to the field of telecommunications recording and distribution systems and, in particular, to a method and system for recording multimedia communication data that can be distributed throughout various public networks and, further, to a method for providing users with the recorded material using standard, off-the-shelf (OTS), distribution utilities. The invention improves upon systems already in place and includes new and unique equipment and features not previously considered.

ACRONYMS AND DEFINITIONS

The written description of the invention below uses a large number of acronyms and art-specific terms to refer to various services, messages and system components. Although most of these acronyms and terms are known to those skilled in the art, some are not standard in the art. Therefore, for purposes of this disclosure certain acronyms and terms are defined as follows:

ACD—(Automatic Call Distributor) A computerized phone system that routes incoming telephone calls to the next available operator or agent. ACDs are the electronic heart of call centers, which are widely used in telephone sales and service departments of all organizations. The ACD responds to the caller with a voice menu and connects the call to an appropriate individual.

Call Center—A company department that handles telephone sales and/or service. Call centers use automatic call distributors (ACDs) to route calls to the appropriate agent or operator.

CO—(Central Office) A local telephone company switching center. There are two types. The first is called an "end office" (EO) or "local exchange" (LE) and connects directly to the outside plant, which is the feeder and distribution system to homes and offices. The end office (often called a "Class 5 office") provides customer services such as call waiting and call forwarding. The second type is the tandem office (also toll office or tandem/toll office), which is a central office that does not connect directly to the customer. Toll call record generation and accounting used to be handled in the tandem offices. Today, the billing is mostly done in the end offices. There are more than 25,000 central offices in the U.S.

CTI—(Computer Telephone Integration) Combining data with voice systems in order to enhance telephone services. For example, automatic number identification (ANI) allows a caller's records to be retrieved from the database while the call is routed to the appropriate party. Automatic telephone dialing from an address list is an outbound example.

DSL—(Digital Subscriber Line) A technology that dramatically increases the digital capacity of ordinary telephone lines (the local loops) into the home or office. DSL speeds are tied to the distance between the customer and the telco central office. DSL is geared to two types of usage. Asymmetric DSL (ADSL) is for Internet access, where fast downstream is required, but slow upstream is acceptable. Symmetric DSL (SDSL, HDSL, etc.) is designed for short haul connections that require high speed in both directions. Unlike ISDN, which is also digital but travels through the switched telephone network, DSL provides "always-on" operation. At the telco central office, DSL traffic is aggregated in a unit called the DSL Access Multiplexor (DSLAM) and forwarded to the appropriate ISP or data network.

DTMF—(Dual-Tone Multi-Frequency) The type of audio signals that are generated when you press the buttons on a touch-tone telephone.

GPRS—(General Packet Radio Service) An enhancement to the GSM mobile communications system that supports data packets. GPRS enables continuos flows of IP data packets over the system for such applications as Web browsing and file transfer. GPRS differs from GSM's short messaging service (GSM-SMS) which is limited to messages of 160 bytes in length.

Nonvoice value-added service that allows information to be sent & received across a Mobile Telephone Network.

GSM—(Global System for Mobile Communications) A digital cellular phone technology based on TDMA that is the predominant system in Europe, but is also used around the world. Developed in the 1980s, GSM was first deployed in seven European countries in 1992. Operating in the 900 MHz and 1.8 GHz bands in Europe and the 1.9 GHz PCS band in the U.S., GSM defines the entire cellular system, not just the air interface (TDMA, CDMA, etc.). As of 2000, there were more than 250 million GSM users, which is more than half of the world's mobile phone population.

GSM phones use a Subscriber Identity Module (SIM) smart card that contains user account information. Any GSM phone becomes immediately programmed after plugging in the SIM card, thus allowing GSM phones to be easily rented or borrowed. SIM cards can be programmed to display custom menus for personalized services. GSM provides a short messaging service (SMS) that enables text messages up to 160 characters in length to be sent to and from a GSM phone. It also supports data transfer at 9.6 Kbps to packet networks, ISDN and POTS users. GSM is a circuit-switched system that divides each 200 KHz channel into eight 25 KHz time slots.

ICR—(Intelligent Call Router) A software-based call processing application that provides call-by-call routing to geographically distributed call centers. The system receives real-time status information from all switching systems in a call center enterprise to create a real-time picture of the status of agents, calls, and peripherals throughout the enterprise. Combine this with the ability to distribute calls through different switching platforms and multiple carriers, and you have a complete intelligent call routing solution.

IN—(Intelligent Network) The public switched telephone network architecture of the 1990s, which was developed by Bellcore (now Telcordia) and the ITU. It was created to provide a variety of advanced telephony services such as 800 number translation, local number portability (LNP), call forwarding, call screening and wireless integration. While Bellcore named its version AIN (Advanced Intelligent Network) for use in North America, there are a variety of proprietary versions throughout the world based on the ITU standard. The IN uses the SS7 signaling protocol in which voice calls (or modem data) travels through circuit-switched voice switches, while control signals travel over an SS7 packet-switched network.

ISDN—(Integrated Services Digital Network) An international telecommunications standard for providing a digital service from the customer's premises to the dial-up telephone network. ISDN turns one existing wire pair into two channels and four wire pairs into 23 channels for the delivery of voice, data or video. Unlike an analog modem, which converts digital signals into an equivalency in audio frequencies, ISDN deals only with digital transmission. Analog telephones and fax machines are used over ISDN lines, but their signals are converted into digital by the ISDN modem.

ISDN uses 64 Kbps circuit-switched channels, called "B channels" (bearer channels) to carry voice and data. It uses a separate D channel (delta channel) for control signals. The D channel signals the carrier's voice switch to make calls, put them on hold and activate features such as conference calling and call forwarding. It also receives information about incoming calls, such as the identity of the caller. Since the D channel connects directly to the telephone system's SS7 signaling network, ISDN calls are dialed much faster than regular telephone calls.

ISDN's basic service is BRI (Basic Rate Interface), which is made up of two 64 Kbps B channels and one 16 Kbps D channel (2B+D). If both channels are combined into one, called "bonding," the total data rate becomes 128 Kbps and is four and a half times the bandwidth of a V.34 modem (28.8 Kbps).

ISDN's high-speed service is PRI (Primary Rate Interface). It provides 23 B channels and one 64 Kbps D channel (23B+D), which is equivalent to the 24 channels of a T1 line. When several channels are bonded together, high data rates can be achieved. For example, it is common to bond six channels for quality videoconferencing at 384 Kbps. In Europe, PRI includes 30 B channels and one D channel, equivalent to an E1 line.

ISP—(Internet Service Provider) An organization that provides access to the Internet. Small Internet service providers (ISPs) provide service via modem and ISDN while the larger ones also offer private line hookups (T1, fractional T1, etc.). Customers are generally billed a fixed rate per month, but other charges may apply. For a fee, a Web site can be created and maintained on the ISP's server, allowing the smaller organization to have a presence on the Web with its own domain name.

Large Internet services, such as America Online (AOL) and Microsoft Network (MSN), also provide proprietary databases, forums and services in addition to Internet access.

MSC—(Mobile Switching Center) The GSM equivalent of an MTSO (Mobile Telephone Switching Office).

MTSO—(Mobile Telephone Switching Office) An operations center that connects the landline PSTN system to the mobile phone system. It is also responsible for compiling call information for billing and handing off calls from one cell to another.

PBX—(Private Branch eXchange) An in-house telephone switching system that interconnects telephone extensions to each other, as well as to the outside telephone network. It may include functions such as least cost routing for outside calls, call forwarding, conference calling and call accounting. Modem PBXs use all-digital methods for switching and may support both digital terminals and telephones along with analog telephones.

PCM—(Pulse Code Modulation) A technique for converting analog signals into digital form that is widely used by the telephone companies in their TI circuits. Every minute of the day, millions of telephone conversations, as well as data transmissions via modem, are converted into digital via PCM for transport over high-speed intercity trunks. In North America and Japan, PCM samples the analog waves 8,000 times per second and converts each sample into an 8-bit number, resulting in a 64 Kbps data stream (a single DS0 channel). The sampling rate is twice the 4 KHz bandwidth required for a toll-quality conversation.

PRN—(Predefined Recorded Numbers) Each recorded call in accordance with the present invention is determined based on whether the number, or identification, of the calling party is a designated PRN. If so, the call data is recorded and stored, if not, the data is not rerouted to the acquisition portion of the system.

PSTN—(Public Switched Telephone Network) The worldwide voice telephone network. Once only an analog system, the heart of most telephone networks today is all digital. In the U.S., most of the remaining analog lines are the ones from your house or office to the telephone company's central office (CO).

SS7—(Signaling System 7) The protocol used in the public switched telephone system (the "intelligent network" or "advanced intelligent network") for setting up calls and providing services. SS7 is a separate signaling network that is used in Class 4 and Class 5 voice switches.

The SS7 network sets up and tears down the call, handles all the routing decisions and supports all modem telephony services such as 800 numbers, call forwarding, caller ID and local number portability (LNP). The voice switches known as "service switching points" (SSPs) query "service control point" (SCP) databases using packet switches known as "signal transfer points" (STPs).

Accessing databases using a separate signaling network enables the system to more efficiently obtain static information such as the services a customer has signed up for and dynamic information such as ever-changing traffic conditions in the network. In addition, a voice circuit is not tied up until a connection is actually made between both parties. There is an international version of SS7 standardized by the ITU, and national versions determined by each country. For example, ANSI governs the U.S. standard for SS7, and Telcordia (Bellcore) provides an extension of ANSI for its member companies.

VoIP—(Voice Over IP) a.k.a. IP Telephony. The two-way transmission of audio over an IP network. When used in a private intranet or WAN, it is generally known as "voice over IP," or "VoIP." When the public Internet is the transport vehicle, it is referred to as "Internet telephony," however, both terms are used synonymously.

Private networks can provide from good to excellent quality, matching that of the PSTN. Over the Internet, voice quality varies considerably; however, protocols that support quality of service (QoS) are expected to improve this condition. Nevertheless, Internet telephony means free voice calls as long as sending and receiving users have identical software that uses proprietary techniques or compatible software that uses the H.323 standard. They must also be willing to talk from their PCs and to prearrange the times to talk. When users go online and launch their IP telephony client software, the session and current IP address is registered on a directory server on the Internet so that others may contact them.

Using Internet telephony service providers (ITSPs), users can make PC-to-phone or phone-to-phone calls, using the Internet as the network backbone. ITSPs have been initially popular for international calls. Another IP telephony application that is expected to take off is with call centers that can answer a question directly from a Web site. This voice integration is desired by user and vendor alike and is expected to flourish in the 2001–2003 timeframe.

The IP protocol is either being used or being considered for future network backbones by all the major telecom carriers.

WAN—A network that connects Local Area Networks (LANs). Usually, uses dedicated lines leased from the telephone company or Public Switched Telephone Network (PSTN) lines.

WAP—(Wireless Application Protocol) A standard for providing cellular phones, pagers and other handheld devices with secure access to e-mail and text-based Web pages. Introduced in 1997 by Phone.com (formerly Unwired Planet), Ericsson, Motorola and Nokia, WAP provides a complete environment for wireless applications that includes a wireless counterpart of TCP/IP and a framework for telephony integration such as call control and phone book access. WAP features the Wireless Markup Language (WML), which was derived from Phone.com's HDML and is a streamlined version of HTML for small screen displays. It also uses WMLScript, a compact JavaScript-like language that runs in limited memory. WAP also supports handheld input methods such as a keypad and voice recognition. Independent of the air interface, WAP runs over all the major wireless networks in place now and in the future. It is also device independent, requiring only a minimum functionality in the unit so that it can be used with a myriad of phones and handheld devices.

BACKGROUND OF THE INVENTION

Recording and archiving data is a frequent and well known practice within various industries, as well as among private individuals. The benefits of retaining copies of written documents, for example, have been recognized for hundreds of years and, as a result, techniques for recording and archiving copies of written documents have evolved over time. With the advent of more modem forms of communication, however, recording and archiving copies of each communication has required the development of new techniques and technologies.

For example, systems have been developed for recording and archiving telecommunication transactions in commercial environments. There are a number of companies, such as Comverse Infosys, Racal Electronics, and Nice Systems Ltd., among others, that currently provide limited telecommunication voice-recording products. Commercial recording, storage and subsequent retrieval of audio messages is required, for example, when financial, personal, contractual or legal information is transmitted, and when emergency services, call center services and/or conference calls are conducted by telephone through public telecommunication networks.

The majority of prior art systems that service the institutional sector, or clients that have a large number of users, require special hardware and software located at the premises of the end-users of the system. Accordingly, because the special hardware is located at the users' premises, whenever a change is required in the system, either because of problems with the system or advances in the technology, the group's work environment must be disrupted in order to implement the change. For example, a typical system can support local call recording and retrieval for up to several hundred users. In order to accommodate such loads, traditional systems require expensive upgrades, in the form of system expansion, i.e., providing additional capacity by adding more units, and/or advances in telecom technology, i.e., improvements in the technologies upon which the transmission of the messages is based. Additionally, utilization of such systems requires end-users to manage and maintain the equipment at their premises, a practice that is costly and time-consuming. Accordingly, a system that enables users to record and archive voice transmissions, without the need for the user to either actively maintain the equipment or to have the necessary equipment located at his/her premises, is desired.

In addition to larger institutional users of the type of systems described above, there is also a present need to supply similar systems that service smaller organizations, or even individual users, as well. For example, presently, there does not exist any prior art systems that allow for the selective recording of individual phone conversations on private, individual, phone lines. All prior art systems that even contemplate recording such conversations are part of a larger institutional system where, for example, a company, or some other large organization, purchases the needed equipment, which as mentioned above, typically is placed at the location of the company. Small, individual users usually do not have the resources, or the need, to purchase such a system.

Furthermore, telecom companies do not provide services, such as selective call recording. Some telecom companies provide answering services that will record an incoming call in the event the intended recipient does not answer the call. However, these services are limited to recording the caller's message and do not include the case of recording a completed two-way call when the recipient actually answers the call. Accordingly, in addition to improvements to the larger institutional, or group, systems, as described above, it is desirable to provide a system that individual users can utilize without being required to purchase and maintain expensive equipment. Thus, if the equipment is located and maintained at the service providers location, the users would be afforded the opportunity to record two-way calls on a required basis. In other words, because the expenses associated with the system are allocated more efficiently, the users would not feel obligated to use the system/service any more often than it needed.

In addition to using public networks for transmitting voice communications, advances in telecommunication technologies have made it possible to transmit various other forms of communications over the same standard public networks. For example, businesses around the world are increasing their use of public networks for transmitting multimedia communications, such as, voice, video, fax, modem, etc., and are increasingly using the Internet (text, voice and video) as a primary source of customer contact. Additionally, these forms of multimedia communication can be transmitted to and from the public networks, both over wireline transmission mediums, such as by using standard landline telephones or computer equipment, as well as over wireless mediums, such as cellular telephones or wireless computer equipment.

Accordingly, in addition to voice transmissions, it is desirable to utilize a preexisting public network infrastructure to send and receive a wide variety of multimedia communications and, as a result, provide recording, storage and distribution/retrieval services to the network users, enabling them to take full advantage of the network-based medium.

For instance, many industries rely on call centers for the collection and dissemination of critical customer information. As call volumes grow, and customer data collection and customer inquiries become more complex, businesses increasingly look for additional functionality, efficiency and flexibility in their communication systems. Improvements in networking technology and innovations in application architecture enable new functionality via the public networks.

The present invention takes advantage of the advancements in the telecommunication industry and provides a method by which virtually any form of communication that is transmitted via a public network, can be selectively recorded and then distributed or retrieved by end-users when needed.

Also, many call center customers are now requiring their telemarketing groups to downsize staffs and reduce the hardware costs associated with operating these groups at corporate and satellite offices. As a result, more customers desire agents, such as in the area of telemarketing, to be located at home, instead of being physically located at customer operated telemarketing centers or satellite offices. As a result, current call center architectures are moving toward a network-based (virtual) call center.

Network-based (virtual) call center service enables a company to locate their customer service staff literally anywhere, i.e., at home, or in any remote location of the company's choice. The network operator is able to provide the virtual call center service to the company through the normal telephone lines. There is no physical "center" involved, so a company need not secure real estate in order to conduct its call center business, nor does it need to obtain certain required hardware necessary to accommodate a physical call center. All this means savings—in investment, maintenance and administration for the company and increased network traffic and revenue for the network operator.

It should be emphasized that the present invention, while ideal for call center application, is by no means limited to that application. Because the inventive system resides, at least in part, at the location of the public network, smaller organizations, such as small and medium-sized enterprises (SME) and small offices and/or home offices (SOHO), or even individual users, will be able to take advantage of the flexibility of the system and obtain only those services that are needed for that particular user.

Call recording and its associated applications are similar to call center services and would realize similar benefits by being hosted on public networks. Traditional voice recording techniques, however, technically cannot support network-based services in the call center area. In regard to the telemarketing example mentioned above, it would be required to place recording equipment in close proximity to each home agent (wherever they are) or near any call center in the network. This would result in an expensive, nonrealistic, non cost-effective system.

It is, therefore, desired to provide businesses and individual users with a network-based recording system that overcomes the current limitations of the traditional voice recording systems and that would allow for the recording of network-based multimedia communications in addition to voice recording, while at the same time, providing a distributed system that does not require specialized hardware located at each user's physical location.

Accordingly, the present invention provides both improvements in current communication recording technology as well as innovations in application architecture to enable wide area recording and distribution and retrieval of a wide variety of multimedia communication types. The different types of communication, such as voice, fax, modem, video, etc, can be transmitted over either wireline or wireless mediums using standard public networks. Additionally, a system in accordance with the present invention is capable of handling tens of thousands of users in parallel fashion.

Prior art systems are directed to solving specific inadequacies in voice recording systems and/or are directed to accessing public networks. No prior art system addresses the issue of providing a network-based multimedia recording system that enables the acquisition, recordation and archival of selected communications of various types that are sent over a public network from a wireline or wireless device, or the subsequent retrieval and/or distribution of the recorded content via the same public network using a variety of different convenient retrieval techniques.

For example, in U.S. Pat. No. 5,881,132 to O'Brien, et al. (Mar. 9, 1999), the inventors describe a method and apparatus for monitoring selected telecommunications sessions in an intelligent switched telephone network. The method involves installation of one or more monitored trunks with translation tables, linksets, and routesets which route all calls to be monitored through monitored loop-back trunks or dedicated inter-office trunk groups. The O'Brien method is described from a telephone service provider's point of view and is primarily directed to providing a means for recording voice communications without being detected. For example, O'Brien addresses customer service considerations relative to a sales call, or law enforcement agencies' concerns where they are involved in evidence gathering. O'Brien does not address the broader concepts involved in configuring a complete, network-based system for providing recording, storage, and distribution and retrieval services for the commercial and private sectors who are not currently being provided with such services. In summary, O'Brien primarily focuses on the front-end, telephony interface technology which enables monitoring of voice messages (call content) and data (signaling information) through intelligent switched telephone networks and is not concerned with the recording and retrieval of various network-based multimedia communications.

In U.S. Pat. No. 6,055,307 to Behnke, et al. (Apr. 25, 2000), the inventors describe a system for selecting and monitoring home agent communications that are transmitted through an intelligent call processing network from a customer to the home agent. The disclosed invention relates to home agents, such as in distributed telemarketing call center systems for retailers and is focused on providing a wide-area network (WAN) for such call-center activities as might be performed by agents geographically separated from a central office. Information regarding customers who call the retailer is stored, as is any information regarding the particular home agent that the customer has talked to previously. As a result, any subsequent call by the customer is routed to the appropriate agent. A supervisor is also connected to the call and, thus, the call can be monitored for customer service purposes. Behnke et al. does not disclose or consider recording and distributing a variety of multimedia communications.

In U.S. Pat. No. 6,078,648 to Albers et al. (Jun. 20, 2000), the inventors disclose a method for an advanced intelligent network (AIN) functionality for electronic surveillance, focusing on law-enforcement activities. The Albers method relies on deploying suitable interface equipment in end office switches of the public telephone network which allows for intelligent routing of calls from one area to another when calls under surveillance cannot be monitored in a particular location due to lack of capability. Albers, however, does not consider the selective recording and distribution of multimedia transmissions as addressed by the present invention.

In U.S. Pat. No. 5,923,744 to Cheng, the inventor describes a method of intercepting call communications within an intelligent network (IN) for law enforcement purposes under the Communications Assistance for Law Enforcement Act (CALEA) at a dedicated service control point (SCP) and routing calls and calling information from a public telephone network to selected subscribers for special centralized services. In IN systems, the intelligence is moved out of each local exchange or service switching point (SSP) to one or more SCPs. Calls are routed to the SCPs by an application module utilizing service trigger flags that are activated following a B-number analysis of call signaling information. Similar to Albers, et al., Cheng addresses issues specific to law enforcement and fails to consider network-based multimedia recording and distribution.

Therefore, in view of the current state-of-the-art in network communication recording and retrieval services, and the corresponding limitations thereto, it would be desirable to provide a method and a system that; includes a wide area solution that bridges over geographical distances of the public networks without loading the network; includes a method to support, in parallel, home clients connected directly to the public network and clients connected to the public network via PBXs (PBX crucial data for recording is not available from the public network side); includes a method to support tens of thousands of clients within an integrated system; serves, in parallel, many businesses and private clients while keeping their privacy intact; enables multimedia recording of voice, fax, data, video and call centers' agent's screens; supports, in parallel, various types of public networks (wireline, wireless, etc.); and, supports a technology trend towards Voice-over-Internet Protocol (VoIP) and a variety of other protocols.

SUMMARY OF THE INVENTION

In view of the aforementioned limitations and restrictions related to the prior art, the present invention provides a system that comprises a robust solution to these limitations, including improvements to the prior art methods as well as unique technological advances never before considered.

An object of the present invention is to provide an architecturally flexible communication recording system that serves virtually any and all users who can contact a telecom network, via wireless or wireline technology, regardless of the location of the user.

Another object of the invention is to provide a communication recording and distribution system wherein each user can access and retrieve his/her own recorded communications without apprehension of unauthorized access by others.

Another object of the present invention is to provide a communication recording and distribution system that affords simple control by end-users such that they can designate specific communications to be recorded by various mechanisms.

Another object of the present invention is to provide a communication recording and distribution system wherein the parties to a recorded communication can be notified of the recording of the transmission either prior to, or during the recorded communication.

Another object of the present invention is to provide a communication recording and distribution system wherein recording can be initiated in several different ways. For example, recording can be performed all the time for certain subscribers, initiated based on predetermined rules or policies, such as, whenever the subscriber is talking, during certain hours of the day, etc., or based on manual input of a subscriber by, for example, pressing certain keys on a keypad.

Yet another object of the present invention is to provide a system that takes advantage of state-of-the-art technologies in several related network and communication areas and provides the subscriber with both financial and time savings as well as economies with respect to required resources and resource management.

Another object of the present invention is to provide a distributed communication acquisition and recording system capable of retrieving, recording and distributing packet and switch data in both wireless and wireline communications systems, wherein the communications can be generated at any one of many different types of communication sources and sent to another one, or more, of an equal number of different types of receiving devices.

Another object of the present invention is to provide a system capable of acquiring communications that are generated at designated sources, regardless of whether the communication is a wireless communication, a wireline communication, or a combination of both, recording the communication, and distributing the recorded communication upon request to a system subscriber authorized to receive the recording, and/or making the recording of the communication available to the subscriber via a variety of mechanisms.

Still another object of the present invention is to provide a system that can acquire, record and distribute multimedia communications from sources, such as, circuit switch telephony networks, IP telephony networks and data networks using standard public tools, such as web browsers, e-mail and DTMF codes, for retrieving many different types of data that propagate through the system.

Still another object of the present invention is to provide a system that utilizes, in parallel, a variety of wireline and wireless communication technologies, i.e., circuit switch and packet data, etc., to enable the recording and retrieval of audio, video and/or data communications.

Yet another object of the present invention is to provide a system capable of recording and distributing many different forms of multimedia communication, such as audio, video, fax, modem, web communications, etc., as well as other types of data, such as screen data corresponding to a particular computing device.

Another object of the present invention is to provide a system that avoids network overload conditions caused by, for example, recording throughput and system architecture, thus ultimately reducing potential data congestion and bottlenecks, by allocating and distributing sufficient resources throughout the system, i.e., between the acquisition and recording portions of the system and/or at the distribution portion.

Another object of the present invention is to provide a system that synchronizes data from different networks resulting in coherent data integration. For example, data from within an organization's PBX can be integrated with data from networks in the public domain, i.e., PSTN.

A further object of the present invention is to provide a system that is scalable depending upon the needs and requirements of the subscribers as well as the amount of data throughput.

A still further object of the present invention is to provide a system that enables each subscriber's recorded content to be isolated from other user's of the system as well as other user's of the networks through which the subscriber's data or call content travels.

To achieve these and other objects there is provided a system that includes; one or more access devices connected to a public network that is also connected to a plurality of multimedia communication devices, the access devices being operable to channel selected communications to acquisition devices, wherein the selected communications can be chosen based on their origin and/or destination; an access administrator associated with each access device that can determine which of the communications transmitted over the network are selected; one or more acquisition devices connected to the access devices that can acquire and process the selected communications from the access devices; one or more recording devices connected to the acquisition devices through a network, each of the recording devices being able to receive the selected communications from the acquisition devices and further able to store and archive the selected communications; and one or more distribution devices connected to the recording devices, each of the distribution devices being able to deliver the stored and archived communications based on a predetermined set of retrieval rules, or provide a mechanism by which individual users can access the recorded material via a variety of retrieval techniques.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which.

DESCRIPTION OF THE PREFERRED
EMBODIMENTS OF THE INVENTION

A preferred embodiment of a communication recording and distribution system and method in accordance with the present invention is described below in detail.

Figure 1:
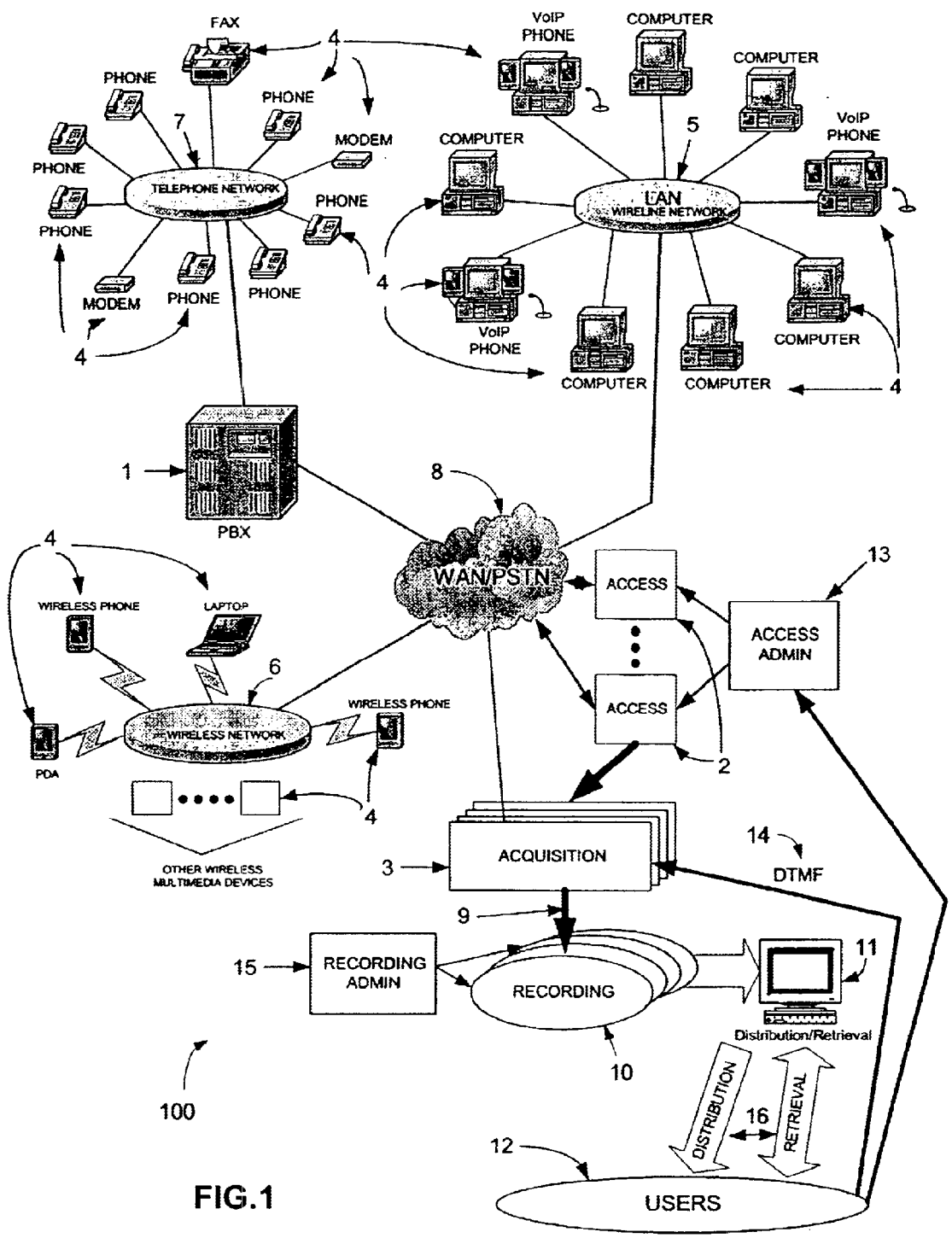
FIG. 1 is a pictorial illustration of the basic functions and data flow of the invention in accordance with a preferred embodiment thereof.

A system in accordance with the present invention, as illustrated, for example, in FIG. 1, includes specialized hardware and software tools used in conjunction with the standard public wireless and wireline communications infrastructure. Some of the hardware is preferably located at a telecom carrier's premises, and some hardware can be located at the premises of an organization or individual user. Various portions of the system can also be distributed throughout various locations depending upon the system throughput requirements and load.

Due to technological advances in the area of bandwidth utilization, technologies such as ISDN and DSL, all types of data transmissions, including audio and video in addition to traditional data formats, are capable of being transmitted via public networks (8). For example, as shown in FIG. 1, various multimedia devices (4) are connected to respective networks, i.e., wireline network (5), wireless network (6) or localized telephone network (7). Each of these networks is, in turn, connected to the public network (8).

Multimedia communications, originating at a variety of types of devices (4), that are sent over public networks (8), for example from PBXs (1), and which are designated to be recorded, are accessed at any of a number of access points (2) and routed to specialized acquisition equipment (3), without disrupting the communication in any way, where the multimedia communications are classified into categories, i.e., fax, video, voice, modem, etc.

Within the acquisition equipment (3), the data is packetized and sent over a data network (9) to one or a number of recording centers (10) where the data is recorded and stored for subsequent distribution. In parallel to recording and storing the data, the recording centers also make the data available to a standard (off-the-shelf) and/or customized Distribution/Retrieval devices (11), where the data can be either; retrieved by users (12) via several different retrieval means, such as, over the Internet from a personal computer, or by calling on a telephone; or the data is packaged and distributed to the users using e-mail or via convenient portable data storage mediums, such as, CDs, tapes, diskettes, etc. The methods and mediums by which data can be retrieved and/or distributed is not limited to those methods disclosed above and the skilled artisan would be able to utilize many different methods without straying from the spirit of the present invention.

Each of the functional components of a system in accordance with the present embodiment are explained separately below. It should be noted, however, that the physical location of the hardware that makes up each component can be distributed throughout the system.

Access

The access component (2) typically resides within the public networks (8) and enables acquisition and recording of specifically identified communications from Predefined Recorded Numbers (PRNs). A PRN can be, for example, a designated telephone, either wireless or wireline, a fax machine, a video camera, a modem, a computer monitor screen or any other identifiable device that can be connected, directly or indirectly, to the network. In FIG. 1, for example, each of the multimedia devices (4) can represent a unique PRN. The access function is implemented using standard public network methods for packet data and circuit switch networking. Methods such as conferencing (mirroring) or forced routing the calls, or data, to the network access point (2) are employed. There may be several access points (2) per network depending on network dimensions and/or topology.

Communications recorded and distributed in accordance with the present invention can be wireline network communications, wherein the PRN is directly connected to the central office (CO) switching center or via a PBX, or they can be wireless network communications. The access function implementation depends on the network hardware and protocol used and includes access to the Call Content, i.e., audio, and signaling from the CO and/or Mobile Switching Center (MSC), as well as any Computer Telephone Integration (CTI) information provided by the PBXs.

In order to manage the PRNs (Predefined Recorded Numbers), which are the numbers that identify the particular devices from which calls are to be recorded, an access administration component (13) is provided in accordance with the invention. The access administration component (13) includes standard network tools that define the PRN parameters that identify communications to be acquired and also define the relevant routing parameters in access point (2) for proper switching of identified PRN data to be acquired. In advanced networks, the primary tools used in access administration (13) are the Intelligent Network (IN) infrastructure and the Intelligent Call Routing (ICR) platforms, which are known to those skilled in the art. In networks without an IN infrastructure, standard network administration can be utilized.

Acquisition

After it has been determined in the access component that a particular call or data transmission is to be recorded, the call/data transmission is directed to the Acquisition component (3) via the access point (2). The Acquisition component (3) is responsible for acquiring call content and call data by using, for example, passive techniques on the access point switch (2), or by using switch emulation techniques (receive, extract a copy of the content, and retransmit the original content to the next network node), or by utilizing the access point Switch (2) conferencing capability. The acquisition component (3) also performs classification (fax, data, audio, video, etc.), compression, store-and-forward (buffering) of the captured information. Subsequent to preprocessing and buffering the data, the Acquisition component ultimately provides that which is to be recorded to the Recording Center (10) using the data networks (9) by any means (private or public).

In order to perform its operations, the Acquisition Component (3) receives telecom signaling, such as SS7 used in the public switched network, and extracts Call Related Information (CRI) such as Call Start, Call End, Calling Number, Called Number, etc., for each call or transmission.

In systems that include PBXs (1), CTI information corresponding to a particular PBX is remotely received by the Acquisition (3) via a Wide Area Network (WAN). The Acquisition (3) performs correlation between the PBX CTI information and SS7 Signaling Call Related Information in order to identify the call of a specific PBX extension. The correlation criterion can be either the number of the called device or the number of the calling party since this data can be found both in the CTI information and the Call Related Information (CRI).

Additionally, in accordance with the present embodiment, the Acquisition component (3) can control the activation and/or deactivation of the recording mechanism according to the subscriber control information supplied via the Call Content. The control is performed using in-band signaling, such as the Dual-Tone Multi-Frequency (DTMF) codes (14) sent by the subscriber, during, prior, or after the completion of the call or transmission. During, or subsequent to, the active session, the DTMF codes, which may include a Personal Identification Number (PIN) code of the subscriber and an additional command character, are extracted and decoded. Accordingly, the recording process is activated and/or deactivated.

Calls and other transmissions can be recorded based on several criteria. For example, as mentioned above, independent calls can be tagged for recording based on reception of authorized DTMF codes on a per call basis. Alternatively, it can be designated that all calls for a particular PRN will be recorded, for example, at all times, for a particular duration of time, at a particular time of day, or when attempting to communicate, i.e., send data, etc., with a particular receiving party. The skilled artisan will be able to determine many different criterion for recording calls, either rule based or event driven, that are still within the scope of the invention.

Recording

After specific calls or transmissions are preprocessed in the Acquisition component (3), they are sent to the Recording center component (10) to be recorded and stored. Prior to the call being recorded, however, and only for calls where it is desired, each of the parties to the call are informed that the call is going to be recorded. For example, an audible tone or message is played that can be heard by all of the parties to the call. The Recording center (10) implements the collection of the call content (voice, data, video, etc.) and the Call Related Information (CRI), performs additional processing, such as fax demodulation, Internet product decoding, etc., then stores and archives the produced products. Subsequently, the Recording center allows access and distribution of the processed data to the end-user (12) via a data network (16) according to his/her access rights and privileges, using a variety of standard retrieval/distribution options. Several Recording centers (10) per system (100) may be used, depending on system dimensions and end-user requirements for content security. Dimensioning, or scaling, of the Recording center is determined according to the number of subscribers, the type of media that is being stored, and the period of time that the data needs to be stored and made available to the end users. The ability to scale the system as required is accommodated by utilizing a modular architecture of a "farm" of storage computers and a "farm" of Web servers.

In accordance with another embodiment of the invention, if a PRN designated for recording has a monitor or screen associated with it, the data provided to the monitor or screen can be designated for recording in similar fashion to digital data, fax, modem, etc., transmissions. For example, the data sent to a particular computer screen, connected to a computer that is resident on a network, can be designated for recording at, for instance, particular times of the day or for particular event sessions. Synchronization of different data content can also be implemented where, for instance, screen data is synchronized with audio data, etc.

Similar to the access component (2) described above, the recording component utilizes a recording administration component (15) that includes various tools for supporting and managing the various options and services of the recording component afforded to subscribers due to the flexible and robust nature of the system. These tools enable the recording center administrator (15) to register new subscribers for desired services. The end user receives a username and password for access and utilization of the system. Additionally, a set of parameters and processing requirements are defined in order to build and maintain the subscriber's privileges and rights within the Recording centers. The capabilities are not limited to those capabilities disclosed above and the skilled artisan would be able to utilize many different capabilities without straying from the spirit of the present invention.

Retrieval/Distribution

In accordance with the preferred embodiment of the invention, retrieval and distribution of the recorded call or transmission data, whether it is recorded audio, video, fax, etc., can be carried out in several ways. Because the data is accessible via public networks, the stored data can be retrieved, for example, via a PC connected to the public network by logging onto a particular Internet Service Provider (ISP) that provides access to the data through a Web Site created for the service. Accordingly, the data can be retrieved over the Internet. Alternatively, a user can call a particular phone number and retrieve certain data over the phone.

Other options for retrieving the recorded data include delivery of the recorded data on a specified schedule or on demand. For example, as mentioned above, e-mail messages can be sent to a particular user with recorded audio attachments. Also, specified recorded data can be placed on a Compact Disc (CD), tape, DVD, or other device to be delivered to the user.

Another example illustrating how data can be distributed to end users in accordance with the present invention is in the case of fax data. When a fax message has been sent that has also been designated for recording, the system in accordance with the present invention logs and stores the fax for delivery at a later, predefined, date and time. Then, since the fax data has been converted, or processed, from fax data into an appropriate format, such as TIFF data, or some other format, the fax message can be delivered to the end-user via the Internet, either by e-mail or by utilizing the Web Site access, or it can be archived and placed on a CD and delivered to the end user at a later time.

Figure 2:
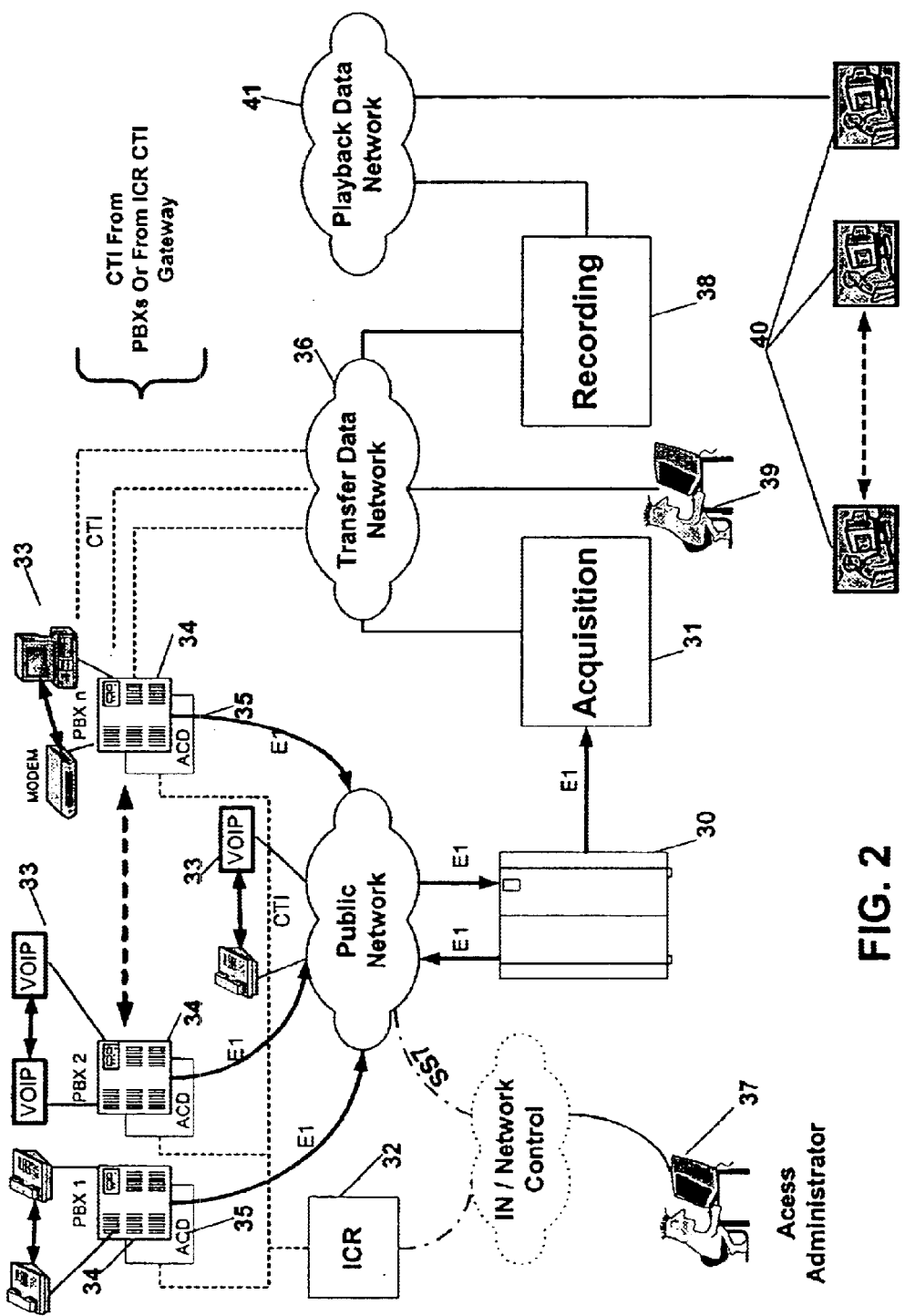
FIG. 2 is a pictorial illustration of the main components of the invention within a telecom network in accordance with a preferred embodiment of the invention.

FIG. 2 is a pictorial illustration of the main components of the inventive system illustrated within a standard telecom network in accordance with another preferred embodiment of the invention. A portion of the components are at the Telecom Carrier premises and the balance are located at the Application Service Provider (ASP) or at the customer's premises. It should be noted that certain of the system components are identified in FIG. 2 with reference numerals different than the numerals provided for similar components described in other embodiments and figures. This was done to maintain consistency in the numbering scheme for each drawing, the functionality for like-named components is the same.

The Access function in accordance with this embodiment comprises several units and is located at the Telecom Carrier premises where one or more access points (30) are linked by E1/T1 lines to Acquisition module(s) (31). In accordance with this embodiment of the invention, the Access function comprises:

1) An Intelligent Call Router (ICR) module (32) that downloads signaling information from a typical telecom network represented by the plurality of telephones (or other multimedia devices) (33) connected to a plurality of PBXs (34) via automatic call distribution modules (ACD) (35) which provide the CTI information at the user's PBX (34). The signaling (CTI) information is provided to the Acquisition module (31) in order to enable end user identification beyond the user's PBX wall.
2) Alternatively, in networks where ICR is not available, CTI information is supplied directly to the Acquisition module (31) by the user's PBX (34) via the transfer data network (36).
3) An Access Switch (30) receives all of the calls and signaling (CRI) of the predefined subscribers and enables the Acquisition module (31) to acquire the call content and the call data by using passive tapping.

The access administrator module (37) provides the customers' PRN parameters as well as the relevant access switch routing parameters for rerouting calls to enable provision of the various service functions to the end users. At the Recording center (38), which is administered by a recording administrator module (39), the subscriber (end user) parameters and processing requirements are defined as well in order to build and maintain the subscriber's content and privileges.

The Acquisition module 31, which may be one or more units, acquires the call content and the call related information (CRI) by using passive tapping (as in the loop case) or termination elements (as in the conferencing case). Acquisition module 31 performs classification (fax, data, voice), compression, store-and-forward (buffering) and delivery of the captured information to the Recording center 38 using the transfer data network (WAN) 36.

The Acquisition module (31) receives telecom signaling (for example via SS7) which is silently monitored to extract the call related information (CRI) such as Call Start, Call End, Calling Number, Called Number, and the like for every call.

In systems which include PBXs, the CTI information supplied from the telephone network via the transfer data network (36) is used in addition to the CRI, to correlate the call to the specific PBXs' subscribers.

CTI information from PBX's (34) is remotely received (via WAN connection) by correlating the relevant subscriber extension number with the Call Related Information (CRI) acquired from one or more access switches (30). It should be noted that, although FIG. 2 shows only a single access switch (30), several switches are typically used. The correlation criterion is the number of the external device called, or the calling party itself, and it appears both in the CTI information and the call related information (CRI).

The Acquisition module (31) can activate/deactivate the recording mechanism according to the subscriber control supplied via the Call Content. The control is performed by DTMF codes (in-band signaling) sent by the subscriber during and/or at the end of the call. The DTMF codes, which may include a subscriber's PIN code, are extracted, decoded and activate/deactivate the recording process according to their content.

The Recording center (38) collects all the data arriving from the Acquisition module(s) (31), via the Transfer Data Network (36), stores, archives and performs post-processing. Access of the processed data by the end users (40) is accommodated via a Playback Data Network (41) according to access rights and privileges. Automatic Recording may be performed at all times in accordance with a set of predefined rules, i.e., rule-based, or upon the occurrence of a certain event, i.e., event-based. On-demand Recording, which is controlled via in-band signaling, such as DTMF codes, or an IP connection, such as from a computer, can be either manual start/stop recording or manual "retrospective" call recording, wherein the recording decision is made after completion of the call.

Figure 3:
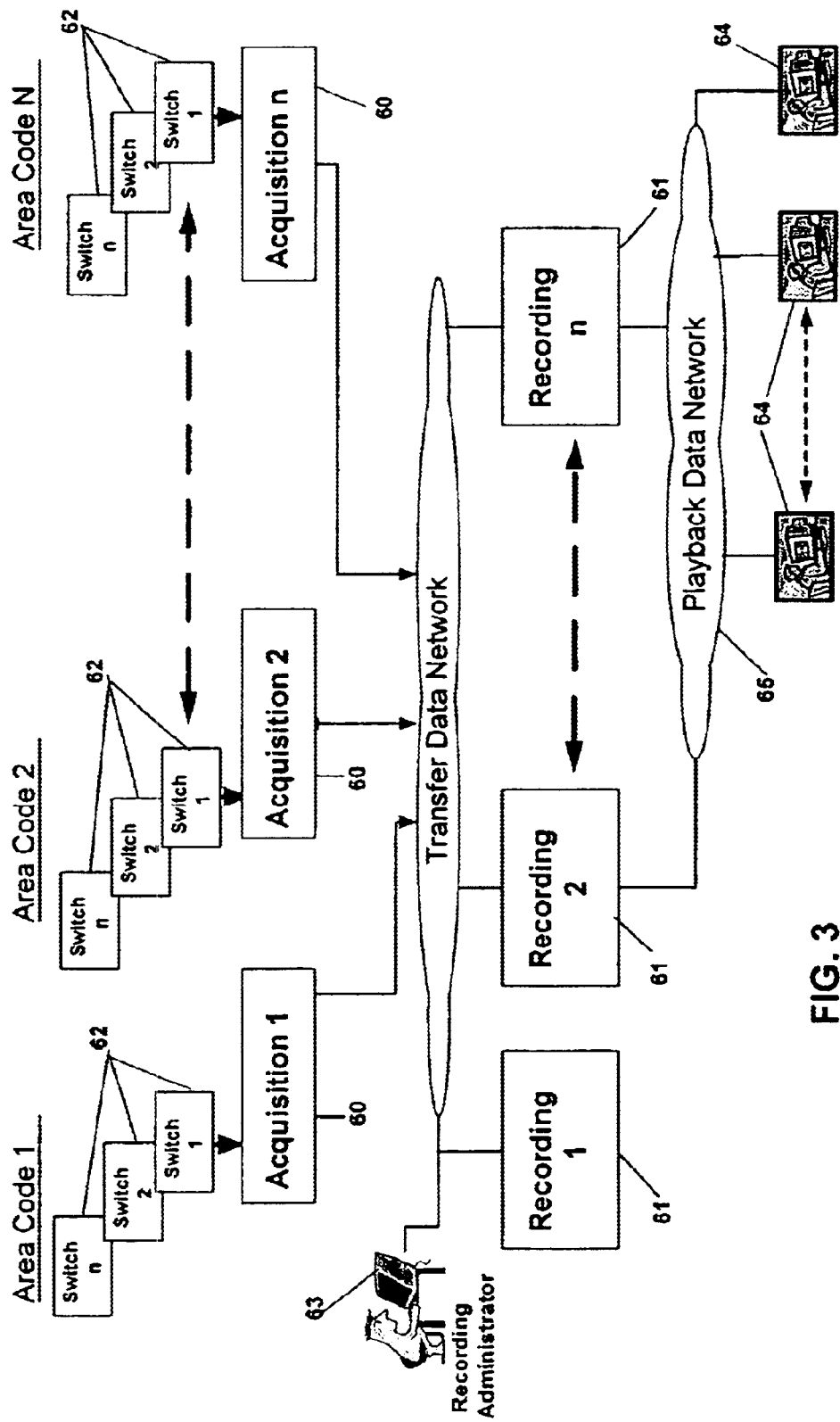
FIG. 3 is a pictorial illustration of a preferred embodiment of the invention in a wide area architecture.

Referring now to FIG. 3, there is depicted another preferred embodiment of the present invention. It should be noted that certain of the system components are identified in FIG. 3 with reference numerals different than the numerals provided for similar components described in other embodiments and figures. This was done to maintain consistency in the numbering scheme for each drawing, the functionality for like-named components is the same.

The embodiment shown in FIG. 3 contains multiple acquisition and recording components distributed throughout the system and the architecture supports full isolation (privacy and security) among the end users. The distributed configuration allows, on one hand, load sharing among Acquisition modules (60) thus, input volume can be extended while handled in a modular way. On the other hand, big customers with rigorous security requirements can get their own Recording center (61) at their premises.

Access to data is available to the end users in a secured manner, i.e., each end user can access his/her own data remotely via the Internet and/or telephone. A plurality of acquisition modules (60) are positioned so as to acquire call content and call related information from the telephone network system across a plurality of area codes (1 through N) accessed through the plurality of telephone switches (62). The allocation of calls to recording centers (61) is done in accordance with the Recording Administrator (63) and, similar to the previously mentioned embodiments, the call content and information can be retrieved by and/or distributed to end users (64) via a playback data network (65).

The system architecture design provides for the recording of calls from/to all of the relevant areas and for the routing of their content and information to selected (central) Recording centers (61) over the distributed network interconnection. The inventive system, thus, bridges the geographical gap between the various access locations and the various different recording sites (recording centers (61)); allows various combinations of access resource sharing by several recording centers; and optimizes the usage of the communication infrastructure among the interception and the recording center sites.

Advantages

A system in accordance with the present invention provides several advantages over systems of the prior art, only a few of which are outlined below. For example, the system utilizes public network based recording services supplied by Telecom Carriers to public and commercial enterprises. Accordingly, each individual user, or subscriber, of the system and its features is provided an economical method of recording, archiving and retrieving communication data in various ways. Since the hardware is generally located at the telecom provider, the subscriber is not burdened with maintenance or replacement costs associated with the equipment. As technology advances and newer, more desirable equipment becomes available, the end user can be insulated from the costs and delays associated with modifying or replacing the equipment. Further, because the user can subscribe to only those services that the user, or the user's organization, needs or desires, the user only has to pay for those specific services. Thus, costs are more efficiently distributed. Another example, the present invention provides to the end user is insulation from technological changes in the telecom market. The architecture of the system in accordance with the invention also isolates the end user from telecom access problems.

Because the system hardware is scalable and is distributed within the public network system and the network of the subscriber enterprise, network congestion conditions can be limited. Additional resources, such as additional access components at the public telephone network or additional recording centers can be added and/or relocated as the system requirements and load demands dictate.

Lastly, due to the flexibility of the system in permitting each end user to specify which services, i.e., methods of recording and distribution/retrieval, he or she wishes to subscribe to, efficient accounting results for each user.

What is claimed is:

1. An intelligent multimedia communications recording system used in conjunction with standard public centralized networks, the system comprising:

a plurality of multimedia devices each device connected to one or more public networks and operable to transmit and/or receive communications from other multimedia devices, wherein said public networks are wireline or wireless networks;

a plurality of predefined recorded numbers (PRNs), each PRN representing a respective identity of each member of a subset of the plurality of multimedia devices, wherein each PRN can correspond to either a sending device or a receiving device and is determined based upon PRN rules provided by a user;

an access means for performing an identification of selected communications corresponding to said PRNs and channeling only the selected communications to an acquisition means, said identification being performed based on acquisition rules provided by said user;

a recording means connected to said acquisition means for storing and archiving the channeled communications and placing them in a condition for either retrieval by, or distribution to, said user;

a retrieval means connected to said recording means for providing access to said stored and/or archived communications;

a distribution means connected to said recording means for delivering said recorded and/or archived communications to said user based on delivery rules provided by said user.

2. A multimedia communications recording system in accordance with claim 1, wherein said multimedia devices include devices from the group consisting of a standard telephone, a Voice over Internet telephone, a fax machine, a video camera, a modem and a computer.

3. A multimedia communications recording system in accordance with claim 1, wherein said access means channels said selected communications to the acquisition means by utilization of forced routing technology.

4. A multimedia communications recording system in accordance with claim 1, wherein said access means channels said selected communications to the acquisition means by utilization of conferencing technology.

5. A multimedia communications recording system in accordance with claim 1, wherein said access means channels said selected communications to the acquisition means by utilization of a switch emulator.

6. A multimedia communications recording system in accordance with claim 1, wherein sniffing technology is used for channeling said selected communications.

7. A multimedia communications recording system in accordance with claim 1, wherein said selected communications recorded by said recording means includes call content data and signaling data.

8. A multimedia communications recording system in accordance with claim 5, wherein said selected communications recorded by said recording means also includes Computer Telephone Information (CTI).

9. A multimedia communications recording system in accordance with claim 1, further comprising:

an access administration means for determining which of the plurality of multimedia devices will operate as PRNs, wherein said access administration means employs an Intelligent Network infrastructure and/or the Intelligent Call Routing (ICR) platform.

10. A multimedia communications recording system in accordance with claim 1, wherein said acquisition means comprises:

a classification means for classifying each of said selected communications into a type of transmission;

a compression means for compressing said selected communications into compressed data; and a buffering means for storing said compressed data.

11. A multimedia communications recording system in accordance with claim 1, wherein said acquisition means utilizes in-band signaling provided by said user, wherein the in-band signaling includes the rules that define whether or not a selected communication is to be recorded.

12. A multimedia communications recording system in accordance with claim 1, wherein said recording means stores both the call content and the call data of the selected communications and performs either modem passive or active demodulation and/or fax decoding and/or Internet product decoding on said stored communications.

13. A multimedia communications recording system in accordance with claim 1, wherein said distribution means includes means that allows the user to access the stored communications from a remote location.

14. A system in accordance with claim 1, wherein said user pays for use of the system based on utilization of specific services with respect to a plurality of different recording methods and/or distribution/retrieval methods.

15. A system in accordance with claim 1, wherein parties to the recorded communications are notified that the communication is being recorded either prior to or during the communication.

16. A system in accordance with claim 1, wherein said access means channels said selected communications to the acquisition means by utilization of passive tapping techniques.

17. An intelligent communications recording system used in conjunction with standard public centralized networks, the system comprising:

one or more access devices connected to a public network, said public network also being connected to a plurality of multimedia communication devices and said access devices being operable to channel selected communications that either originate at, or are directed to, one or more predetermined ones of said multimedia communication devices;

an access administrator associated with each access device, said access administrator being operable to determine said selected communications;

one or more acquisition devices connected to said access devices, said acquisition devices being operable to acquire and process the selected communications from said access devices;

one or more recording devices connected to the acquisition devices through a network, each of said recording devices operable to receive said selected communications from the acquisition devices and further operable to store and archive said selected communications; and one or more distribution devices connected to said recording devices, each of said distribution devices being operable to deliver said stored and archived communication based on a predetermined set of retrieval rules.

18. A system in accordance with claim 17 wherein said acquisition devices are further operable to classify the selected communications into one or more of a plurality of data types.

19. A system in accordance with claim 17 wherein said acquisition devices are further operable to store and forward the selected communications.

20. A system in accordance with claim 17 wherein said recording device is controlled via in-band signaling.

21. A system in accordance with claim 17 wherein each multimedia communication device from which communications are to be recorded is associated with a Predefined Recording Number (PRN) and the system is capable of recording selected communications based on a set of case rules, wherein said case rules define a set of PRNs from independent networks.

22. A method for managing intelligent, network-based, multi-media recording and distribution services for distributed business organizations via a wide-area public switched telecom network or a wireless network, said method comprising:

establishing telecom links with a plurality of service access nodes in the public telecom network for accessing subscriber calls, containing both voice and data;

assigning unique PRN values to each of a subset of communications devices connected to the public telecom network;

defining PRN parameters that identify communications to be acquired, wherein the identification of the communications to be acquired is based at least on the PRN value assigned to a communication device from which the acquired communication is initiated or to which the acquired communication is directed;

processing call content and call information directed through a transfer data network to at least one recording center;

establishing at least one recording administration module for defining and controlling recording, and all associated recording processing and storage policies, and retrieval/distribution services of said subscriber calls derived from the public network; and transferring retrieval/distribution data through a retrieval/distribution data network to at least one workstation for providing said retrieval/distribution service.

23. The method of claim 22 wherein said distributed business organizations comprise small organizations and private users.

24. The method of claim 22, further comprising:

implementing an end-user's system administration function for services provided, including system maintenance and control in said access administration module.

25. The method of claim 24, further comprising:

providing supervision for said system administration function by at least one system administrator.

26. The method of claim 22, wherein said at least one acquisition management module collects, stores, and processes information from a plurality of networks.

27. The method of claim 26, wherein said plurality of networks comprises circuit switch telephony networks, IP telephony networks, and data networks.

28. The method of claim 27, wherein said data networks comprise ISP networks and GPRS networks.

29. The method of claim 22, wherein said recording and playback services are provided to end-users in a secure manner so as to assure privacy for each of said end-users with respect to the storage, retrieval and distribution of said data.

30. The method of claim 22, wherein said recording and retrieval/distribution services comprise multi-media (MM) transactions including recording, storing, and playback of audio, video, fax, modem communications, Web communications, and monitoring screens.

31. The method of claim 30, wherein said MM transactions are accomplished manually.

32. The method of claim 30, wherein said MM transactions are accomplished retroactively, after said transactions have been completed.

33. The method of claim 30, wherein said MM transactions are accomplished automatically and are rule-based.

34. The method of claim 22, wherein said recording is enabled for each end-user of said network system, for control of recordings attributable to said each end-user.

35. The method of claim 34, wherein said control comprises setting recording on or off for a specified period of time.

36. The method of claim 34, wherein said control comprises setting recording on or off while a call is in progress.

37. The method of claim 34, wherein said control is performed by pressing predefined telephone buttons.

38. The method of claim 22, wherein said plurality of service access nodes provides access for end-users to stored data via Internet as well as telephony connections.

39. The method of claim 22, wherein said recording and retrieval/distribution services are provided via at least one of E-mail, CD, DVD, digital tape and telephony, on a periodic basis in accordance with subscriber agreements.

40. The method of claim 22, wherein said recording and retrieval/distribution services comprise fax services.

41. The method of claim 40, wherein said fax services comprise recording, demodulation, and classified storage over end-user defined time intervals between short term and a long-term period.

42. The method of claim 40, wherein said fax services are provided to end-users from any location via at least one of Internet connection and on-site fax machine.

43. A system for managing intelligent, network-based, multi-media recording and playback services to distributed business organizations via a wide-area public telecom network, said system comprising:

a plurality of service access nodes connected to telecom links in the public telecom network;

a plurality of communication devices each having access to the public telecom network, wherein each of a subset of said plurality of communication devices is assigned a PRN value;

at least one access administration module for defining PRN parameters that identify communications to be acquired, wherein the identification of the communications to be acquired is based at least on the PRN value assigned to a communication device from which the acquired communication is initiated or to which the acquired communication is directed;

at least one acquisition management module for processing content and call information directed through a transfer data network to at least one recording center;

at least one recording administration module for processing recording and playback information derived from said public network; and at least one playback workstation to receive playback data for playback service.

44. The system of claim 43, wherein said recording and playback system further comprises a system maintenance and control function implemented in said end-user's access administration module.

45. The system of claim 43, wherein said system provides synchronization and integration of call information from telephony trunks with internal data from within the organization of said end-user in order to enrich the data collected.

46. The system of claim 45, wherein said synchronization is achieved by matching the call data which is mutual among both channels: the call start and end time and the calling number.

47. The system of claim 42, wherein said call information is enabled by a CTI protocol connected with the end-user's PBX.

48. The system of claim 45, wherein said call information comprises call times, called party, calling party, and like information.

49. The system of claim 42, wherein said internal data comprises identification of the call monitoring agent acquiring said call.

50. The system of claim 43, wherein said recording is automatic and rules-based.

51. The system of claim 43, wherein said recording is accomplished manually.

52. The system of claim 43, wherein said recording is accomplished during said call or retroactively after the completion of each of said calls.

53. The system of claim 43, wherein said administration modules is supervised by at least one system administrator for each administration module in said system.

54. The system of claim 43, wherein said recording and playback services are provided via at least one option selected from the group: wireline telephone, wireless telephone, E-mail with voice attachment, voice-over-Internet (VoIP), voice over intranet, recording media, and a dedicated workstation provided with a modem.

55. The system of claim 43, configured in an open, flexible, and expandable architecture allowing parallel recording from all communications sources and adaptation to a variety of telecommunications technologies without regard to end-user interfaces and MM interfaces, enabling both centralized recording and distributed playback access such that:

for small organizations and private users, monitoring is performed at the network provider, while data can be put at the network provider; and for larger organizations, monitoring is performed at the network provider, while data can be put inside the organization of the specific end-user.

56. The system of claim 55, wherein said open architecture is centralized.

57. The system of claim 55, wherein said open architecture is distributed.

58. The system of claim 55, wherein said architecture uses the bandwidth of the network to enable broadband MM services, including video.

59. The system of claim 55, wherein said architecture provides for access load balancing.

60. The system of claim 59, wherein said load balancing comprises allocation by said system of a plurality of access points and distribution of said access points among the network switches.

61. The system of claim 43, wherein said administration modules provide access to centralized fax recording, demodulation, and classified storage services.

62. The system of claim 43, wherein said administration modules provides access to a fax logger with archiving and remote access features.

63. The system of claim 62, wherein said fax logger transmits faxes to E-mail and E-mail to faxes in a centralized system.

64. The system of claim 62, wherein said fax logger is operable from a fixed-line telephone serving as a long-term recorder.

65. The system of claim 62, wherein said fax logger is operable from a cellular telephone serving as a long-term recorder.

* * * * *